UNITED STATES PATENT OFFICE.

JOHN D. PENNOCK AND JOSEPH A. BRADBURN, OF SYRACUSE, NEW YORK.

PROCESS OF MAKING BLEACHING-POWDER AND CAUSTIC SODA.

SPECIFICATION forming part of Letters Patent No. 428,408, dated May 20, 1890.

Application filed December 16, 1889. Serial No. 333,970. (No specimens.)

*To all whom it may concern:*

Be it known that we, JOHN D. PENNOCK and JOSEPH A. BRADBURN, of Syracuse, in the county of Onondaga, in the State of New York, have invented new and useful Improvements in the Process of Manufacturing Bleaching-Powder and Caustic Soda, of which the following is a full, clear, and exact description.

Our invention relates to the process of manufacturing bleaching powder and caustic soda, in which common salt is used as a base for the several reactions.

Our object is to simplify the process and reduce the cost of production.

Our process consists in the new and novel method described as follows, and specifically set forth in the claim annexed.

Into a still constructed of stone and provided with suitable tubes for heating we introduce salt and add a sufficient amount of nitric acid to transform it into nitrate of soda. Upon applying a gentle heat the decomposition begins and the nitrate of soda is rapidly formed. As the nitrate of soda is extremely soluble in a hot solution, the operation is so conducted that the solution of nitrate of soda in the still is saturated at the boiling temperature. The solution is then run out from the still and cooled. Owing to the great difference in the solubility of nitrate of soda in hot and cold solutions a great mass of the salt is deposited on cooling. Over half of the quantity of nitrate of soda in solution at 110° to 120° centigrade is deposited on cooling the solution down to 20° centigrade. The crystals obtained by this cooling are separated from the mother-liquor, which, together with more salt and nitric acid, is again sent to a still and the operations repeated.

The gases resulting from the reaction in the still, composed principally of nitrosyl chloride and chlorine, pass into a vessel containing nitric acid and manganese dioxide in suspension, where nitrate of manganese is formed and chlorine is given off. The chlorine evolved passes through a washer and then into a bleaching-powder apparatus.

A very great superiority of our process over others is that all the chlorine combined with the sodium in salt is obtained in the form of bleaching-powder, and that the gas passing to the bleaching-powder chamber is pure chlorine gas, thus avoiding the weak and impure chlorine obtained in all the magnesia processes and avoiding the loss of two-thirds of the chlorine which is incurred in the Weldon process.

The crystals of nitrate of soda obtained by cooling the nitrate-of-soda solution coming from the still are mixed with two or three times their own weight of oxide of iron. The mixture is then heated to a red heat in a current of air in a cylindrical furnace. The nitrate of soda is completely decomposed and the gases evolved with an excess of air are passed over an oxidizing substance, such as manganese dioxide, a manganite, a manganate, or a permanganate of the alkalies or of the alkaline earths.

The nitrate-of-manganese liquor mentioned above is heated and evaporated to a plastic consistency by the hot gases coming from the decomposition of the nitrate of soda. The nitrous gases coming from the decomposition of nitrate of soda and nitrate of manganese finally pass after treatment with air and steam into the usual apparatus for condensation of nitric acid. Nitrate of manganese evaporated to the plastic condition mentioned above contains about ninety per cent. MnO—2. It will thus be seen that both the nitric acid and manganese are recovered. The mixture of iron oxide and soda is taken from the furnace and lixiviated. If the heat has not been carried too high the mixture is in good condition for lixiviation. If lixiviated with hot water, a caustic liquor of 30° Baumé to 40° Baumé may be obtained practically free from carbonate of soda, so that when this liquor is evaporated and made into caustic soda an extremely high test of caustic soda may be obtained.

What we claim is—

The herein-described process for the manufacture of bleaching-powder (chloride of lime) and caustic soda, consisting of the following steps: first, treating salt in a still heated by steam or its equivalent with nitric acid; second, by passing the resulting gases, nitrosyl chloride and chlorine, through a vessel containing nitric acid and manganese dioxide, the gas—chlorine—resulting being passed through a washer and then to the bleaching-powder chamber, and, third, the recovery of the nitric acid in the nitrate of soda by furnacing with oxide of iron and the lixiviation of the mixture to produce caustic soda, and the recovery of nitric acid from the nitrate of manganese by heat, leaving $MnO-2$, which is used over again.

In witness whereof we have hereunto set our hands this 14th day of December, 1889.

JOHN D. PENNOCK.
JOSEPH A. BRADBURN.

In presence of—
H. P. DENISON,
F. T. DENISON.